United States Patent [19]

Moynihan

[11] Patent Number: 4,519,841

[45] Date of Patent: * May 28, 1985

[54] OFFSET PRINTING INK

[75] Inventor: John T. Moynihan, Herndon, Va.

[73] Assignee: American Newspaper Publishers Association, Washington, D.C.

[*] Notice: The portion of the term of this patent subsequent to Dec. 6, 2000 has been disclaimed.

[21] Appl. No.: 556,471

[22] Filed: Nov. 30, 1983

Related U.S. Application Data

[63] Continuation-in-part of Ser. No. 337,220, Jan. 6, 1982, Pat. No. 4,419,132.

[51] Int. Cl.$^3$ .............................................. C09D 11/06
[52] U.S. Cl. ......................................... 106/27; 106/31
[58] Field of Search ............................ 106/27, 31, 273

[56] References Cited

U.S. PATENT DOCUMENTS

| | | | |
|---|---|---|---|
| 2,416,676 | 3/1947 | Bernardi et al. | 106/29 |
| 4,107,327 | 8/1978 | Tilson et al. | 428/304 |
| 4,197,221 | 4/1980 | Eisenmenger et al. | 523/351 |
| 4,383,860 | 5/1983 | Uhlemayr et al. | 106/27 |
| 4,419,132 | 12/1983 | Moynihan | 106/27 |

Primary Examiner—Paul Lieberman
Assistant Examiner—Amelia B. Yarbrough
Attorney, Agent, or Firm—David H. Semmes; Warren E. Olsen

[57] ABSTRACT

A non-petroleum base newspaper offset printing ink comprising a blend of Gilsonite (uintaite) flakes and tall oil fatty acid together with carbon black pigment. The proportions of the Gilsonite and the tall oil fatty acid may be varied, as viscosity requirements change due to differences in press speeds, newsprint characteristics, and the like. The ink thus has readily adjustable viscosity, together with an enhanced flow and penetration characteristics, while being extremely economical to manufacture.

4 Claims, No Drawings

OFFSET PRINTING INK

CROSS-REFERENCES TO RELATED APPLICATIONS

A continuation-in-part of applicant's earlier application Ser. No. 337,220, entitled PRINTING INK, filed Jan. 6, 1982, issued as U.S. Pat. No. 4,419,132 on Dec. 6, 1983.

The present application is restricted to offset inks and contains additional disclosure relating to an offset fountain water formulation. A companion application Ser. No. 556,493 entitled LETTERPRESS PRINTING INK was filed Nov. 30, 1983.

BACKGROUND OF THE INVENTION

1. Field of the Invention

Printing inks, particularly newspaper printing inks which have a non-petroleum base, which are environmentally acceptable while providing reduced misting with extra mileage and good quality.

2. Description of the Prior Art

Discussed in a PRIOR ART STATEMENT being submitted separately.

SUMMARY OF THE INVENTION

According to the present invention, a non-petroleum base offset ink is formulated from carbon black pigment and a blend of Gilsonite (uintaite) with tall oil fatty acid. The resultant printing ink provides an ink having enhanced viscosity, flow and penetration characteristics, while being exceptionally economical to manufacture. As a result, the ink is highly suitable for printing at contemporary press speeds, is quick drying and, thus, avoids the conventional problems of offset and "strike thru".

DESCRIPTION OF THE PREFERRED EMBODIMENTS

The present ink, having a non-petroleum base, is without dependence upon a diminishing petroleum supply, is environmentally acceptable and competitive in cost with the materials used in commercial letterpress and offset inks.

A typical formulation includes:

EXAMPLE I

| ANPA-OFFSET NO. 275 INK | |
|---|---|
| FA-1 tall oil fatty acids | 54.90% |
| Gilsonite | 23.53% |
| Carbon black | 21.57% |
| | 100% |

The acid fountain solution had a pH of 3.5–4.0 and was made from Varn Products Company concentrate.

FA-1 Tall Oil Fatty Acid (Arizona Chemical Company), is specified as follows:

| Product Characteristics | Specification | Typical lot |
|---|---|---|
| Color, Gardner, 1963 | 9 max | 5 |
| Acid Value | 190 min. | 194 |
| Saponification Value | | 197 |
| Iodine Value | | 131 |
| Composition: | | |
| Moisture, % | Less than | 0.1 |
| Ash, % | Less than | 0.001 |
| Rosin Acids, % | 5.0 max | 4.5 |
| Unsaponifiables % | 3.0 max | 2.7 |
| Fatty Acids Total, % | | 92.8 |
| Fatty Acid Composition: | | |
| Linoleic, Non-Conjugated, % | | 34 |
| Linoleic, Conjugated, % | | 9 |
| Oleic, % | | 44 |
| Saturated, % | | 5 |
| Other Fatty Acids, % | | 8 |
| Specific Gravity, 25°/25° C. | | 0.906 |
| Weight Per Gallon, 25° C., Lbs. | | 7.53 |
| Viscosity, Gardner-Holdt, 25° C. | | A |
| Viscosity, SUS, 100° F. | | 100 |
| Flash Point, Open Cup, °F. | | 400 |
| Fire Point, Open Cup, °F. | | 440 |

Procedure:

FA-1 grade tall oil fatty acid is heated with ZECO 11 A grade Gilsonite from Ziegler Chemical Corporation at 300° F. After solution of the solid Gilsonite, the blend is cooled and filtered. After the blend is made, carbon black pigment in the form of Elftex 115 pellets, Cabot Corporation, is dispersed within the blend with a Morehouse Mill. The carbon black pellets were ground to a National Printing Ink Research Institute grindometer reading of one (1). Viscosity adjustment can be made by adding small amounts of the tall oil fatty acid as a final step, if necessary.

Gilsonite has been the subject of long-term animal studies which indicate that it is a non-toxic, non-carcinogenic organic substance. In accordance with Section 710.4 of the Toxic Substance Control Act, Gilsonite, as a naturally occurring mineral, is automatically included in the initial inventory. The Chemical Abstract Registry Number is 12002-43-6.

Elftex carbon black pellets are a product of Cabot Corporation, 125 High Street, Boston, Mass. 02110, with properties for printing ink applications described as follows:

| TYPICAL PROPERTIES OF CABOT FURNACE PROCESS CARBON BLACKS FOR PRINTING INK APPLICATIONS | | | | | | | | | |
|---|---|---|---|---|---|---|---|---|---|
| | | | Surface Area | Particle | Oil (DBP) Absorption cc/100 grams | | Tinting | Volatile | Fixed |
| | | Nigrometer | ($N_2$ S.A.) | Size | | | Strength | Content | Carbon |
| Fluffy | Pellets | Index | $m^2/gm$ | Millimicrons | Fluffy | Pellets | Index | % | % |
| | ELFTEX ® Pellets | 90 | 75 | 27 | — | 123 | 99 | 1.0 | 92.5 |
| | ELFTEX Pellets 115 | 90 | 66 | 27 | — | 115 | 100 | 1.0 | 92.5 |
| ELFTEX 8 | | 90 | 85 | 27 | 103 | — | 100 | 1.0 | 99.0 |

TYPICAL PROPERTIES OF CABOT FURNACE PROCESS CARBON BLACKS FOR PRINTING INK APPLICATIONS
-continued

| Fluffy | Pellets | Nigrometer Index | Surface Area ($N_2$ S.A.) $m^2/gm$ | Particle Size Millimicrons | Oil (DBP) Absorption cc/100 grams | | Tinting Strength Index | Volatile Content % | Fixed Carbon % |
| --- | --- | --- | --- | --- | --- | --- | --- | --- | --- |
| | | | | | Fluffy | Pellets | | | |
| ELFTEX 12 | | 93 | 45 | 37 | 95 | — | 73 | 1.0 | 99.0 |

The above data in no way constitute a specification or certification for any particular shipment or shipments, but simply represent typical values based on analyses of spot samples from actual recent production of these grades.
MOGUL BLACK PEARLS, REGAL, ELFTEX, STERLING and VOLCAN are registered trademarks for carbon blacks manufactured by Cabot Corporation.

Physical characteristics of the ink formulations have been determined as follows:

| | Formulation % | | |
| --- | --- | --- | --- |
| | Ink 275 | 53209 | 53213 |
| FA-1 | 54.9 | 50.1 | 50.4 |
| Carbon 115 | 21.6 | 27.8 | 19.3 |
| Zeco 11A | 23.5 | 19.9 | 21.6 |
| 910 B Toner | — | 2.2 | 2.1 |
| Bentone 12B | — | — | 6.6 |
| TOTAL | 100.0 | 100.0 | 100.0 |
| Viscosity, Brookfield | 900 Poises | 1000 Poises | 1000 Poises |
| Micrometer Tach (400 RPM) | 4.0 | 3.5 | 3.25 |
| Flow Inches/Minute | 0.75 | 0.2 | 0.2 |

Milori Blue 910 B is manufactured by Diacolor Division of Dainichiseika Color & Chemicals and is described as follows:

MILORI BLUE 910 B

Beaded Form-Dustless

This product is recommended for use in Nitrocellulose, Polyamid, Quickset, Heatset, and Alkyd systems, where it offers high gloss, high speed dispersibility and low viscosity. Can be used for toning of heatset and quickset black inks.

| Color Index - Pigment Blue 27 No. 77510 | | | |
| --- | --- | --- | --- |
| CAS No. - 25869-98-1 | | | |
| Physical Data: | | Light Fastness: | |
| Specific Gravity | 2.05 | Full Strength | Excellent |
| Pounds/Gallon | 17.10 | Reduced Shade | Good |
| Oil Absorption | 40.00 | | |
| pH | 5.00 | | |
| Properties: | | Bleed Resistant | |
| Stability in | | | |
| Acid & Alkali | | | |
| 2% $H_2SO_4$ | Excellent | Litho Varnish | Excellent |
| 2% NAOH | Poor | Mineral Spirits | " |
| | | Xylene | " |
| | | Methyl Ethyl Ketone | " |
| | | Paraffin | " |
| Heat Resistance: | | | |
| 130° C. - 30 min. | Very good | Water | " |
| 180° C. - 30 min. | Fair | Ethyl Alcohol | " |

Bentone 128 is a gellant product of NL Industries, Inc., Industrial Chemicals Division, P.O. Box 700, Hightstown, NJ 08520, with properties described as follows: "a special montmorillonite clay that has been organically modified. This rheological additive is designed for non-polar printing inks and will also gel inks containing solvents of intermediate polarity (from "Bentone 128-a rheological additive specifically designed for printing inks, DS-471, June 1978").

The foregoing Example I offset printing ink formulation may be employed with a tap water fountain, comprised as follows:

| | Parts/100 | LBS (10 gal.) |
| --- | --- | --- |
| Tap Water | 100 | 83.4 |
| Gum Arabic | 0.1 to 1.0 | — |
| $CaCl_2$ | 0.0581 | 0.0485 |
| AMWAY L.O.C. | 0.025 | 0.02085 |
| Conductivity, Micromhos/cm. = | 1500 | |
| pH - | 7.25 | |

The Amway L.O.C. (Liquid Organic Cleaner), was manufactured by Amway Corporation, Ada, Mich., U.S.A., and is described as an all purpose liquid cleaner from a specially processed organic base derived from pure coconut oil.

BROOKFIELD VISCOSITY

The lower limit of viscosity and upper limit of flow have not been determined to date. The ink appears to have less strike-through even at low viscosities and at long flow length versus petroleum inks.

Principal advantages of the ink include the capability of printing at high press speeds, the low cost of formulation and the elimination of petroleum. The ingredient, Gilsonite, may be fed to animals and indeed, fatty acids are edible.

It is found that letterpress and offset inks having a viscosity in the range 20 to 1000 poises may be suitable. It appears that 1000 poises would be the upper limit for a printing ink when the inking cylinder actually contacts a reservoir of ink. Ink of such viscosity would be difficult to pump in some modern press usage. The ink viscosity is correlated, of course, to the density of the newspaper stock and the thickness of the page, as well as press speed.

Manifestly, various proportions of the Gilsonite and tall oil ingredients may be employed without departing from the spirit of invention.

I claim:
1. An offset printing ink comprising:
   a. Carbon black in the range 10% to 27.8%,
   b. Gilsonite in the range 17.6% to 23.5%, and
   c. Tall oil fatty acid in the range 50.1% to 54.9%.
2. An offset printing ink as in claim 1, including black ink toner approximately 2.2%.
3. An offset printing ink comprising:
   a. Carbon black 19.3%,
   b. Gilsonite 21.6%,
   c. Tall oil fatty acid 50.4%, and
   d. a montmorillonite clay gellant-6.6%.
4. An offset printing ink comprising:
   a. Carbon black 27.8%,
   b. Gilsonite 19.9%,
   c. tall oil fatty acid 50.1%, and
   d. black ink toner 2.2%.

* * * * *